May 27, 1952 G. T. BAKER 2,598,097

ASSEMBLING AND CONNECTING NONLINEAR RESISTANCE ELEMENTS

Filed April 26, 1946 3 Sheets-Sheet 1

INVENTOR
GEORGE THOMAS BAKER

BY Chas. Lu. Candy

ATTORNEY

ASSEMBLING AND CONNECTING NONLINEAR RESISTANCE ELEMENTS

Filed April 26, 1946 3 Sheets-Sheet 2

INVENTOR
GEORGE THOMAS BAKER
BY Chas. W. Candy
ATTORNEY

ASSEMBLING AND CONNECTING NONLINEAR RESISTANCE ELEMENTS

Filed April 26, 1946 3 Sheets-Sheet 3

INVENTOR.
GEORGE THOMAS BAKER
BY
Chas. W. Candy.
ATTORNEY

Patented May 27, 1952 2,598,097

UNITED STATES PATENT OFFICE 2,598,097

ASSEMBLING AND CONNECTING NON-LINEAR RESISTANCE ELEMENTS

George Thomas Baker, Liverpool, England, assignor to Automatic Electric Laboratories Inc., Chicago, Ill., a corporation of Delaware Application April 26, 1946, Serial No. 665,020
In Great Britain June 13, 1945

8 Claims. (Cl. 201—68)

Figure 1:
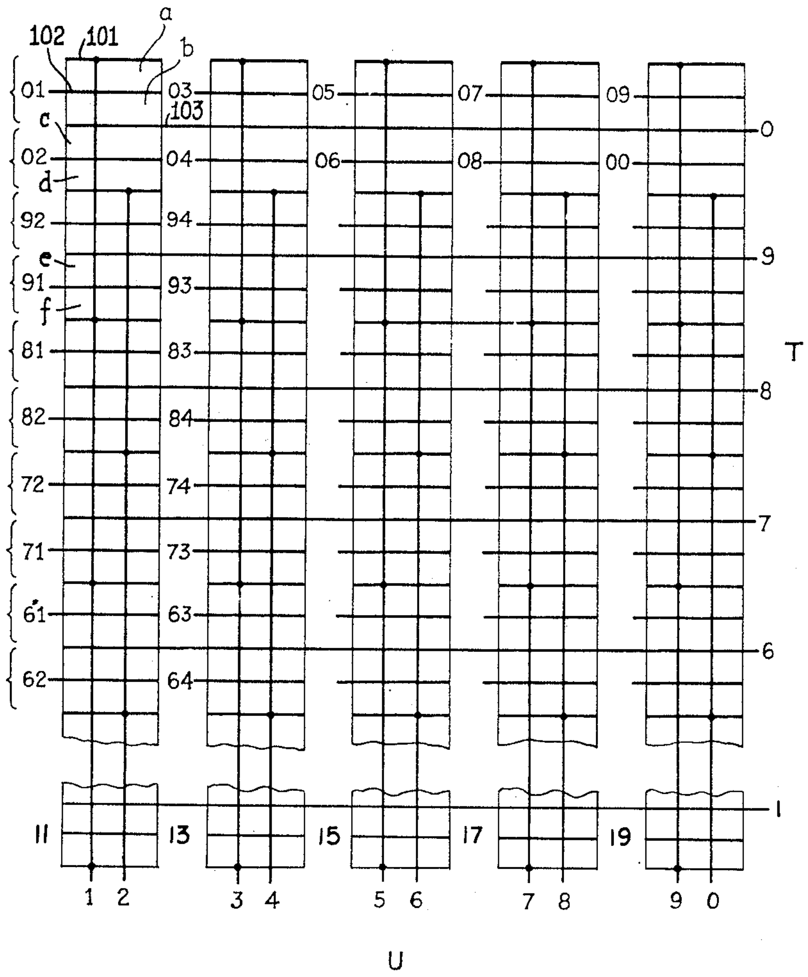

The present invention relates to electrical signalling systems and particularly equipment for the identification of lines particularly calling lines in telephone systems in which calls may be set up and recorded automatically. The invention is moreover particularly concerned with identification equipment of the line marking type such as is described in United States specification No. 2,292,977 in which each line of an exchange is impressed with code markings characteristic of the number concerned.

The problem then arises of connecting a common signal source to all the various line circuits without effectively connecting the circuits together and this may readily be accomplished by the use of non-linear resistance discs or elements of like formation of the carborundum-ceramic type, for instance such as those described in United States specification No. 2,292,977. As described in the above-mentioned application, for the purpose of marking a 4-digit subscriber's number, use is made of two discs per line to reduce mechanical switching to a minimum, one marking thousands and tens digits and the other marking hundreds and units digits. Hence for each group of 100 subscribers' lines 200 discs will be required and it is the object of the invention to provide improved means of assembling and electrically interconnecting such a group of non-linear resistance discs.

According to one feature of the invention, in a telephone system in which arrangements for the identification of lines involve the use of two non-linear resistance discs for each line, a plurality of pairs of discs are clamped face-to-face in a frame to form a compact unit, conducting members provided with connecting means being inserted between the faces of adjacent discs prior to clamping.

According to a feature of the invention, in a telephone system in which arrangements for the identification of calling lines involve the use of two non-linear resistance discs for each line, the two discs are connected to the metering lead of each subscriber's line circuit and the discs are assembled in a plurality of blocks which are mounted on the meter rack adjacent to the corresponding subscriber's meters.

According to another feature of the invention, in a telephone system in which arrangements for the identification of lines involve the use of at least two non-linear resistance discs for each line, the non-linear resistance discs for a group of lines, in which each line has a distinguishing code number comprising two digits, are clamped together without intervening insulators to form an assembly and in order to enable commoning to be readily effected between discs for lines having the same value of one of the digits and between those for lines having the same value of the other digit, the discs for lines having the same value of one of the digits are included in one column and those for lines having the same value of the other digit occupy corresponding positions in different columns, so that the desired commoning is effected solely longitudinally and transversely of the columns.

According to a still further feature of the invention, in a telephone system in which arrangements for the identification of calling lines involve the use of two non-linear resistance discs for each line, a plurality of pairs of discs together with suitable connecting means for each face of each disc are arranged in columns and the columns are rigidly clamped together by metal clamping rods encased in insulating tubes and extending between two clamping plates, the clamping rods occupying positions closely adjacent to the edges of the discs in the various columns so as to prevent lateral movement thereof in any direction.

Figures 2, 3, 4:
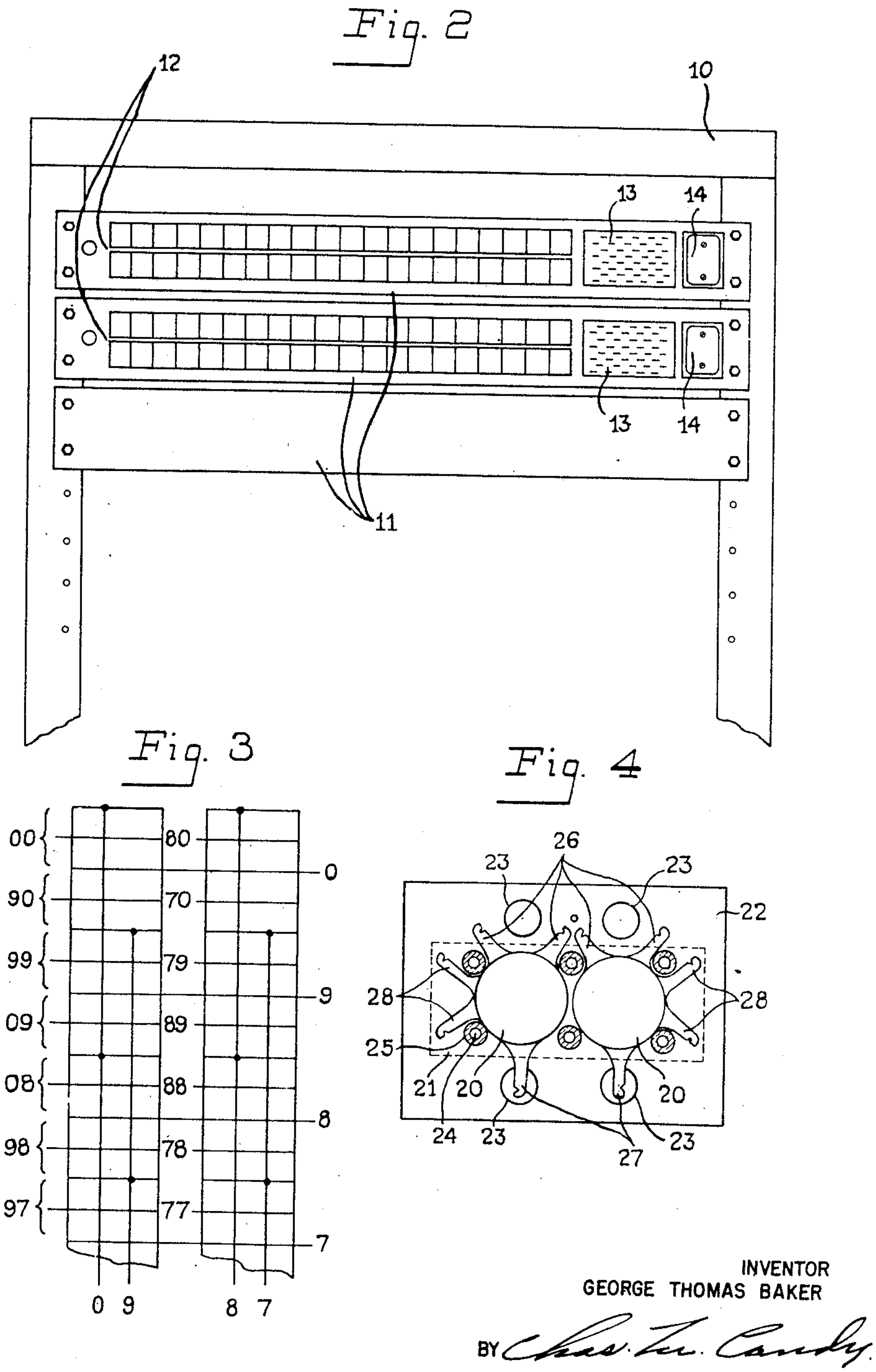
Figure 5:
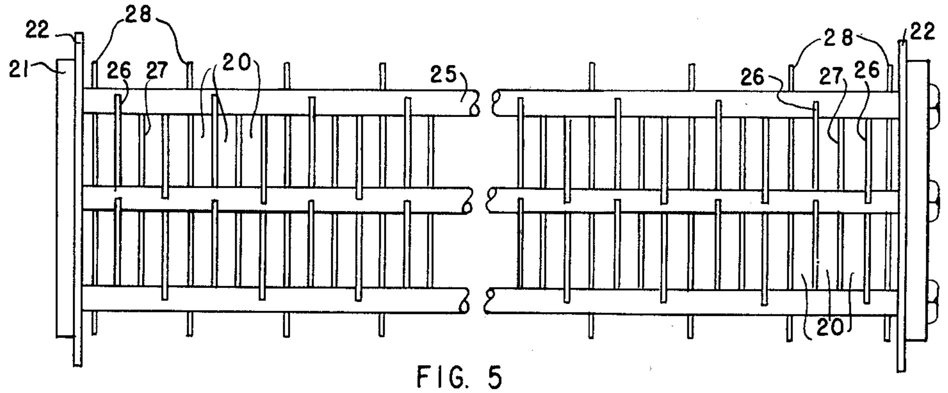
Figure 6:
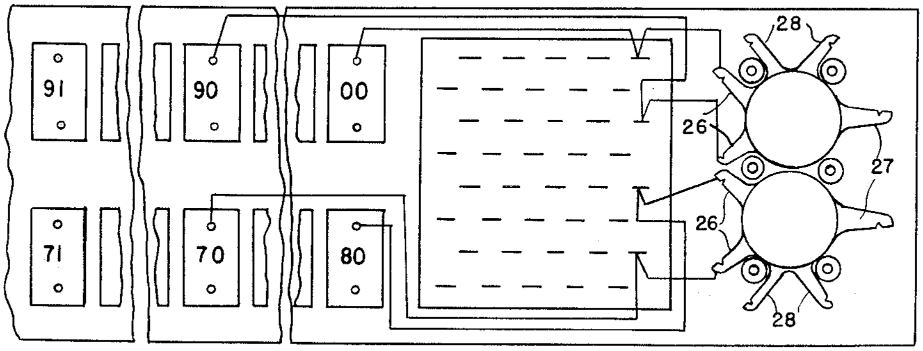

The invention will be better understood from the following description of one method of carrying it into effect reference being had to the accompanying drawings. In these drawings Fig. 1 shows diagrammatically a portion of an assembly of 100 pairs of discs by means of which the line marking of a group of 100 subscribers can be effected with a minimum of mechanical switching, Fig. 2 shows the method of mounting the assembly of discs on the meter rack, Fig. 3 shows diagrammatically a portion of an assembly of 40 pairs of discs and Fig. 4 shows a cross-sectional view taken through an assembly of 40 pairs of discs. Fig. 5 shows a partial side view of the assembly 14 on the upper mounting plate 11 showing the disposition of the resistance elements and the connecting plates in the assembly. Fig. 6 shows a broken view of the upper mounting plate 11 with connections from meters 70, 80, 90 and 00 to corresponding resistance elements.

Referring to Fig. 1, there are five columns in the assembly, each comprising twenty pairs of circular discs such as the pair *a* and *b*, and these columns are rigidly clamped together by means of six pairs of steel rods extending between two heavy metal clamp plates, a plate of insulating material being interposed at the top and bottom to separate the columns from the clamp plates. Each pair of discs is arranged for connection to a particular line, for example, the discs *a*—*b* are for a line having a distinguishing code number 01, the discs *c*—*d* are for a line having a distinguishing code number 02, and the discs *e*—*f* are for a line having a distinguishing code number 91. The steel clamping rods are encased in insulating tubes of suitable dimensions and occupy positions closely adjacent to the edges of the discs in the various columns so as to prevent any lateral movement thereof in any direction.

Electrical connection to the faces of the discs, which are preferably metal-sputtered to ensure good electrical conductivity, is effected by metal connecting plates of substantially the same size as the discs. These plates are either individual such as the plate 101 between the top insulator plate (not shown) and the upper surface of disc *a* or the plate 102 between the lower face of disc *a* and the upper face of disc *b*, or form part of common metal connecting strips, such as the plate 103 between the lower face of disc *b* and the upper face of the disc *c*, which extend across the various columns of the assembly. The individual connecting plates which require vertical commoning, for instance by means of bare thinned copper wire, are provided with wiring tags which extend to the front of the assembly while the remaining individual plates, which do not require vertical commoning, are provided with tags which for convenience extend to the rear of the assembly. The common strips are provided at each end with wiring tags although for clarity wiring tags have only been shown at one end in the drawing.

Considering now the interconnection of the various discs, each group of 100 subscribers will utilise numbers ending with the tens and units digits 11—00. The adjacent faces of each pair of the discs will be connected through a metal connecting plate to the metering wire M of a line circuit bearing a distinguishing code number as for example the pair of discs *a* and *b* are connected from the connecting plate 102 to the metering wire M of a line circuit having a distinguishing code number 01. A line circuit suitable for this purpose is shown in the pending application of Reginald Taylor and George Thomas Baker, Serial No. 651,294, filed March 1, 1946, now Patent No. 2,550,208, granted April 24, 1951. The other face of one of the discs of a pair will be connected to a units digit marking lead via a metal connecting plate and a bare commoning wire which effects connection with one face of one disc of each of the pairs which are to be connected to the line circuits of lines having distinguishing code numbers terminating in the same digit. The other face of the disc *a* for example will be connected to the units digit 1 marking lead and the units digit 1 marking lead is connected with one face of one disc of each of the pairs serving the ten lines having distinguishing code numbers 01, 91, 81 . . . 11. The other face of the other disc of a pair will be connected through a metal connecting plate to a tens digit marking lead which effects connection with one face of one disc of the pairs which are to be connected to the line circuits of lines having distinguishing code numbers beginning with the same digit. The other face of disc *b* for example will be connected to the tens digit 0 marking lead by way of the metal connecting strip 103 which extends across the five columns and which is common to the similar discs of the ten lines having distinguishing code numbers 01, 02, 03 . . . 00.

Thus for the purpose of marking any one of the 100 line circuits served by the assembly only twenty marking leads need extend from line marking equipment, ten of which serve for marking the units digits of the numbers concerned and ten for marking the tens digits. This arrangement is shown in detail in United States Patent No. 2,292,977.

In order to cater for the remaining digits of the subscribers' numbers, which may comprise a thousands digit and a hundreds digit, each block of non-linear resistors representing 100 lines has a thousands digit and a hundreds digit applicable to the whole block, and since in the system described in the above-mentioned specification the two discs provided for each subscriber's line are arranged one for marking thousands and tens digits and the other for marking hundreds and units digits, the tens commons will be connected together over all blocks having the same thousands digit while the units commons will be connected together over all blocks having the same hundreds digit. In a 10,000 line exchange there will be 100 blocks having the same thousands digit and 100 blocks having the same hundreds digit, and hence the 10,000 marking wires equivalent to all the subscribers on such an exchange are thus statically reduced to 200 for line marking purposes.

It will be appreciated that the invention is not limited to an assembly consisting of 100 pairs of discs. In fact it may in some circumstances be preferable to employ an assembly having a different number of pairs of discs. For instance, since each pair of discs is to be connected to the metering lead of the subscriber's line, it is convenient to mount the assembly or block on the meter rack as shown in Fig. 2. This drawing shows the upper portion of a typical meter rack 10 for use in telephone exchanges and is provided with a number of plates 11 each of which accommodates a block of forty meters 12 and the associated combined meter test point 13 and wiring tag block, the test points appearing at the front of the plate and the wiring tags at the rear. Since it is desirable the *a* block of resistance discs, such as 14, serving the same lines as the meters is mounted on each plate 11, each block will consist of forty pairs of resistance elements.

By suitably arranging the connection of the pairs to the metering lead, having regard to the number of the associated subscribers' lines, the advantages of longitudinal and transverse multipling can, however, still be retailed. Thus a typical arrangement for a block of 40 discs connected to the metering leads of lines having numbers 61 to 00 is partially shown in Fig. 4, from which it will be seen that the commoning for the units digits is effected transversely and for the tens digits longitudinally.

It will be appreciated, however, that the interconnections between the blocks will now be different from the case where the block serves 100 lines. Since in the scheme described in United States specification No. 2,292,977 it is essential to group each 100 lines, the discs in the first two blocks and the first 40 discs in the third block will be interconnected to provide the equivalent of the 100-line block shown in Fig. 1. Similarly the last 40 discs in the third block will be interconnected with the discs in the fourth and fifth blocks.

Referring now to Fig. 4, which shows a cross-sectional view through the block, the discs 20 are mounted, as previously mentioned, in two columns of 40 discs each between metal clamping plates of which one, 21, only is visible in the drawing, the clamping plates being insulated from the discs by means of a plate of suitable insulating material 22. The insulating plate 22 is provided with apertures 23 by which the block may be secured to the meter rack. The discs are held against lateral movement by means of six rods such as 24 having threaded ends, one end engaging in tapped holes in one clamping plate while nuts on the other end serve to clamp the assembly together. The rods 24 are insulated from the discs by means of insulating sleeves 25. A metal disc is interposed between two discs, a wiring tag being formed integral with each metal disc. The tags 26 are integral with the metal discs between the 1st and 2nd; 3rd and 4th; 5th and 6th and so on resistance discs and connections are taken therefrom to the metering leads of the subscribers' lines. The tags 27 are integral with the metal discs between the 2nd and 3rd; 6th and 7th; 10th and 11th and so on resistance discs and serve for horizontal multipling between the two columns. The tags 28 are integral with the metal disc on top of the 1st resistance disc and those between the 4th and 5th; 8th and 9th and so on resistance discs and serve for vertical multipling throughout each column.

Referring now to Fig. 5, which shows a broken cross sectional view of a block of discs such as illustrated by Figs. 3 and 4, the discs 20 and the connecting plates 26, 27 and 28 are held together between the insulators 22 by the metal clamping plates 21 and the rods 24. The connecting plates 26 are for connecting specific pairs of discs to external apparatus such as meters and subscribers' line circuits as shown in the application for Telephone or Like Systems, Serial No. 651,294, filed March 1, 1946. The connecting plates 27, of which the wiring tags are not shown, are for effecting the transverse multiple between the discs in the two columns, such as the multiples 0, 9, 8, etc. shown in Fig. 3. The connecting plates 28 are for effecting the longitudinal multiple between discs in the same column, such as the multiples 0, 9, 8, etc. shown in Fig. 3. The left metal clamping plate 21 is suitable for mounting on a plate 11, as shown in Fig. 2.

Referring now to Fig. 6, which shows a broken view of a mounting plate 11 with equipment such as shown in the upper mounting plate in Fig. 2, the meters are associated with a group of lines having the digits 71 to 00 inclusive as the last two digits of their code numbers. The upper terminal of the meter 00 is connected to a terminal 26 associated with the pair of discs 20 nearest the mounting plate 11 in the upper column of discs. The upper terminal of the meter 90 is connected to a terminal 26 associated with the adjacent pair of discs in the same column. The upper terminals of the meter 80 is similarly connected to the first pair of discs in the lower column and the upper terminal of the meter 70 is connected to the adjacent pair of discs in the lower column. The upper terminals of the meters are connected to the metering leads of corresponding line circuits and the lower terminals of the meters are connected to the line switches of corresponding line circuits as shown in application Serial No. 651,294. Other meters are similarly connected, the meters 99 and 09 being connected to the third and fourth pair of discs respectively in the upper column, the meters 79 and 89 being connected to the third and fourth pair of discs respectively in the lower column, and so on.

It is to be understood that, while the word "discs" has been employed throughout the specification, the invention is not limited to the use of precisely circular resistance elements, the circular form merely being the most convenient to manufacture and to assemble into a block.

The disc assembly according to the invention is characterised by the robustness and rigidity of a terminal block and involves a minimum of interconnecting wiring between discs. It is furthermore characterised by saving in space due to the absence of intervening insulators between discs and between pairs of discs, this being accomplished by the layout of the pairs of discs in the various columns wherein a face of a disc of one pair requiring connection to a vertical or horizontal common is mounted adjacent the face of a disc of another pair which requires to be similarly connected.

I claim:

1. A plurality of pairs of non-linear resistance elements each having a distinguishing code number comprising two digits, assembly means for clamping said elements together in columns, mounting means for mounting the columns so that the elements having the same value for one of the digits of their code numbers appear in certain positions in one of said columns and the elements having the same value for the other of the digits of their code numbers appear in corresponding positions in others of said columns, the assembly means and mounting means of said columns enabling commoning between the elements having the same value for one of the digits of their code numbers to be effected solely longitudinally and transversely of said columns.

2. An arrangement of non-linear resistance elements as set forth in claim 1 in which the elements comprising a column are clamped together by metal clamping plates, and in which said elements are insulated from said clamping plates.

3. An arrangement of non-linear resistance elements as set forth in claim 1 in which metal connecting plates are arranged in contact with each element for effecting interconnection between said elements and for effecting external connections to said elements.

4. An arrangement of non-linear resistance elements as set forth in claim 3 in which certain of said metal connecting plates form part of common metal connecting strips, said strips being utilized for transverse commoning between said elements.

5. In an assembly of non-linear resistance elements, a plurality of pairs of non-linear resistance elements each having a plurality of faces, connecting means for each face of each resistance element, assembly means for clamping together rigidly in columns a plurality of said pairs and a plurality of said connecting means, said assembly means comprising insulated rods extending longitudinally of said columns and adjacent edges of said resistance elements so as to prevent lateral movement thereof in any direction.

6. An assembly of non-linear resistance elements as set forth in claim 5 in which said connecting means comprise metal plates having suitable terminals for effecting interconnection between said resistance elements and for effecting external connections to said resistance elements.

7. An assembly of non-linear resistance elements as set forth in claim 5 in which the faces of said resistance elements are metal sputtered to insure good electrical conductivity between said resistance elements and said metal plates.

8. An assembly of non-linear resistance elements as set forth in claim 5 in which certain of said connecting means form part of common metal connecting strips, said strips commoning certain of said resistance elements in different columns.

GEORGE THOMAS BAKER.

REFERENCES CITED

The following references are of record in the file of this patent:

UNITED STATES PATENTS

| Number | Name | Date |
|---|---|---|
| 329,646 | Hibbard | Nov. 3, 1885 |
| 1,053,242 | Thompson | Feb. 18, 1913 |
| 1,471,391 | Dunlop | Oct. 23, 1923 |
| 1,952,679 | Leveen | Mar. 27, 1934 |
| 2,137,423 | Taylor et al. | Nov. 22, 1938 |
| 2,143,414 | Grisdale | Jan. 10, 1939 |
| 2,228,405 | Saville | Jan. 14, 1941 |
| 2,254,366 | Hammond | Sept. 2, 1941 |
| 2,292,977 | Taylor et al. | Aug. 11, 1942 |
| 2,346,910 | Deakin | Apr. 18, 1944 |
| 2,369,868 | Taylor et al. | Feb. 20, 1945 |